(12) United States Patent
Hawkes et al.

(10) Patent No.: US 8,505,081 B2
(45) Date of Patent: Aug. 6, 2013

(54) METHOD AND APPARATUS FOR IDENTITY REUSE FOR COMMUNICATIONS DEVICES

(75) Inventors: Philip Hawkes, New South Wales (AU); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 12/883,374

(22) Filed: Sep. 16, 2010

(65) Prior Publication Data

US 2011/0191835 A1 Aug. 4, 2011

Related U.S. Application Data

(60) Provisional application No. 61/299,504, filed on Jan. 29, 2010.

(51) Int. Cl.
*H04L 29/06* (2006.01)

(52) U.S. Cl.
USPC .............................. 726/6; 455/425; 455/435.1

(58) Field of Classification Search
USPC ......... 726/6, 21, 28, 29, 30, 5; 370/241–278; 455/433–558
See application file for complete search history.

(56) References Cited

U.S. PATENT DOCUMENTS

| | | | |
|---|---|---|---|
| 6,618,394 B1 | 9/2003 | Hilleary | |
| 8,219,065 B2 * | 7/2012 | Chen et al. | 455/411 |
| 2005/0181793 A1 * | 8/2005 | Netanel | 455/435.2 |

FOREIGN PATENT DOCUMENTS

| | | |
|---|---|---|
| EP | 1892974 A1 | 2/2008 |
| WO | 02060194 A2 | 8/2002 |

OTHER PUBLICATIONS

Erlichman et al., Hybrid Flow-Control for CDMA2000, IEEE, 2007, p. 1.*
Haverinen et al., "Extensible Authentication Protocol Method for Global System for Mobile Communications (GSM) Subscriber Identity Modules (EAP-SIM)", Jan. 2006, p. 11.*
Digital cellular telecommunications system (Phase 2+), Universal Mobile Telecommunications System (UMTS), LTE, IP Multimedia Subsystem (IMS), Stage 2 (3GPP TS 23.228 version 9.2.0 Release 9), Technical Specification, European Telecommunications Standards Institute (ETSI), 650, Route Des Lucioles , F-06921 Sophia-Antipolis, France, No. V9.2.0, Jan. 1, 2010, XP014045255.
International Search Report and Written Opinion—PCT/US2011/023075, ISA/EPO—May 24, 2011.

* cited by examiner

*Primary Examiner* — Tonia L Dollinger
*Assistant Examiner* — Davoud Zand
(74) *Attorney, Agent, or Firm* — James T. Hagler (57) ABSTRACT

An apparatus and method for identity reuse operable in a communications system, the method comprising selecting an identity value for a device; registering the device onto a network with the selected identity value; determining if the registration of the device is successful; and establishing a communication session for the device and deregistering the selected identity value upon termination of the communication session if the registration is successful, or determining whether to try a different identity value if the registration is not successful. In one aspect, the apparatus and method further comprising waiting a predetermined time period before either re-registering with the selected identity value or registering with the different identity value.

40 Claims, 5 Drawing Sheets

METHOD AND APPARATUS FOR IDENTITY REUSE FOR COMMUNICATIONS DEVICES

CLAIM OF PRIORITY UNDER 35 U.S.C. §119

The present application for patent claims priority to Provisional Application No. 61/299,504 entitled Method and Apparatus for Identity Reuse for Communications Devices filed Jan. 29, 2010, and assigned to the assignee hereof and hereby expressly incorporated by reference herein.

FIELD

This disclosure relates generally to apparatus and methods for identity reuse for communications devices. More particularly, the disclosure relates to reuse of the international mobile subscriber identity (IMSI) or mobile identification number (MIN) and the mobile station international subscriber directory number (MSISDN) or the mobile directory number (MDN) in communications networks.

BACKGROUND

In many telecommunication systems, communications networks are used to exchange messages among several cooperating spatially-separated devices. The various types of networks may be classified in different aspects. In one example, the geographic extent of the network could be over a wide area, a metropolitan area, a local area, or a personal area, and the corresponding networks would be designated as wide area network (WAN), metropolitan area network (MAN), local area network (LAN), or personal area network (PAN). Networks may also be distinguished by the switching or routing technique used to interconnect the various network nodes and devices (e.g. circuit switching vs. packet switching), by the type of physical media employed for transmission (e.g. wired vs. wireless), or by the communication protocols used (e.g. Internet protocol suite, SONET (Synchronous Optical Networking), Ethernet, etc.).

One important attribute of communications networks is the usage of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are more static forms of communications networks and may be favored for interconnection of fixed network elements or for bulk data transfer. For example, fiber optic cables are often the preferred transmission media for very high throughput transport applications over long distances between large network hubs, such as, bulk data transport across or between continents over the Earth's surface.

SUMMARY

Disclosed is an apparatus and method for identity reuse for communications devices. According to one aspect, a method for identity reuse operable in a communications system, the method comprising selecting an identity value for a device; registering the device onto a network with the selected identity value; determining if the registration of the device is successful; and establishing a communication session for the device and deregistering the selected identity value upon termination of the communication session if the registration is successful, or determining whether to try a different identity value if the registration is not successful. In one aspect, the method further comprising either waiting a predetermined time period before re-registering with the selected identity value or registering with the different identity value.

According to another aspect, an apparatus for identity reuse operable in a communications system, the apparatus comprising a processor and a memory, the memory containing program code executable by the processor for performing the following: selecting an identity value for a device; registering the device onto a network with the selected identity value; determining if the registration of the device is successful; and establishing a communication session for the device and deregistering the selected identity value upon termination of the communication session if the registration is successful, or determining whether to try a different identity value if the registration is not successful. In one aspect, the apparatus further comprising program code for either waiting a predetermined time period before re-registering with the selected identity value or registering with the different identity value.

According to another aspect, an apparatus for identity reuse operable in a communications system, the apparatus comprising means for selecting an identity value for a device; means for registering the device onto a network with the selected identity value; means for determining if the registration of the device is successful; and means for establishing a communication session for the device and deregistering the selected identity value upon termination of the communication session if the registration is successful, or determining whether to try a different identity value if the registration is not successful. In one aspect, the apparatus further comprising means for either waiting a predetermined time period before re-registering with the selected identity value or registering with the different identity value.

According to another aspect, a non-transitory computer-readable medium storing a computer-readable instructions, wherein execution of the computer-readable instructions are for: selecting an identity value for a device; registering the device onto a network with the selected identity value; determining if the registration of the device is successful; and establishing a communication session for the device and deregistering the selected identity value upon termination of the communication session if the registration is successful, or determining whether to try a different identity value if the registration is not successful. In one aspect, computer-readable instructions are also for either waiting a predetermined time period before re-registering with the selected identity value or registering with the different identity value.

Advantages of the present disclosure may include allowing a large set of devices to utilize a smaller set of identity values, thus resulting in a more efficient usage of a finite set of identities. Another advantage may include allowing operator to easily evolve from one solution to another.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
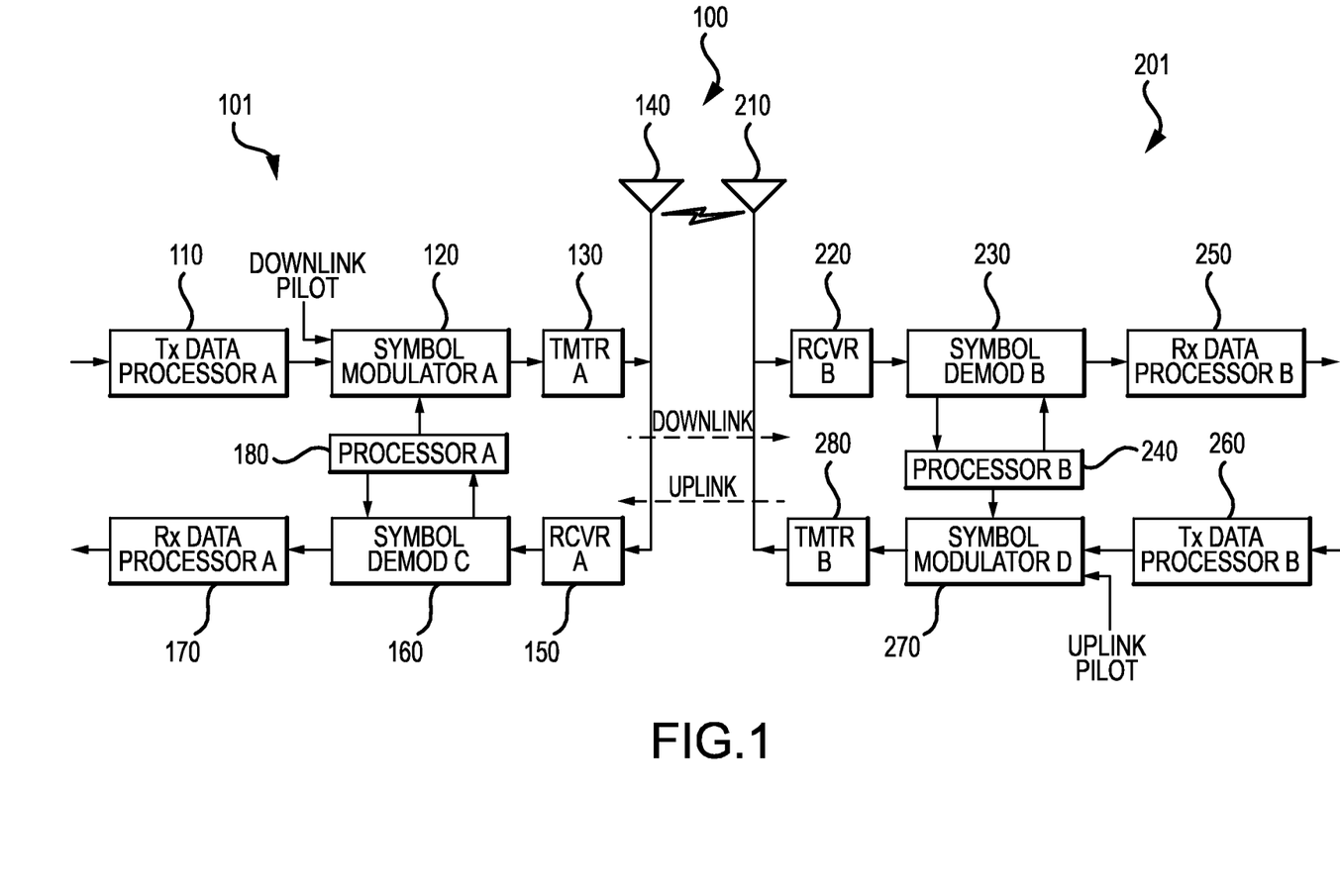
FIG. 1 illustrates an example of an access node/user equipment (UE) system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
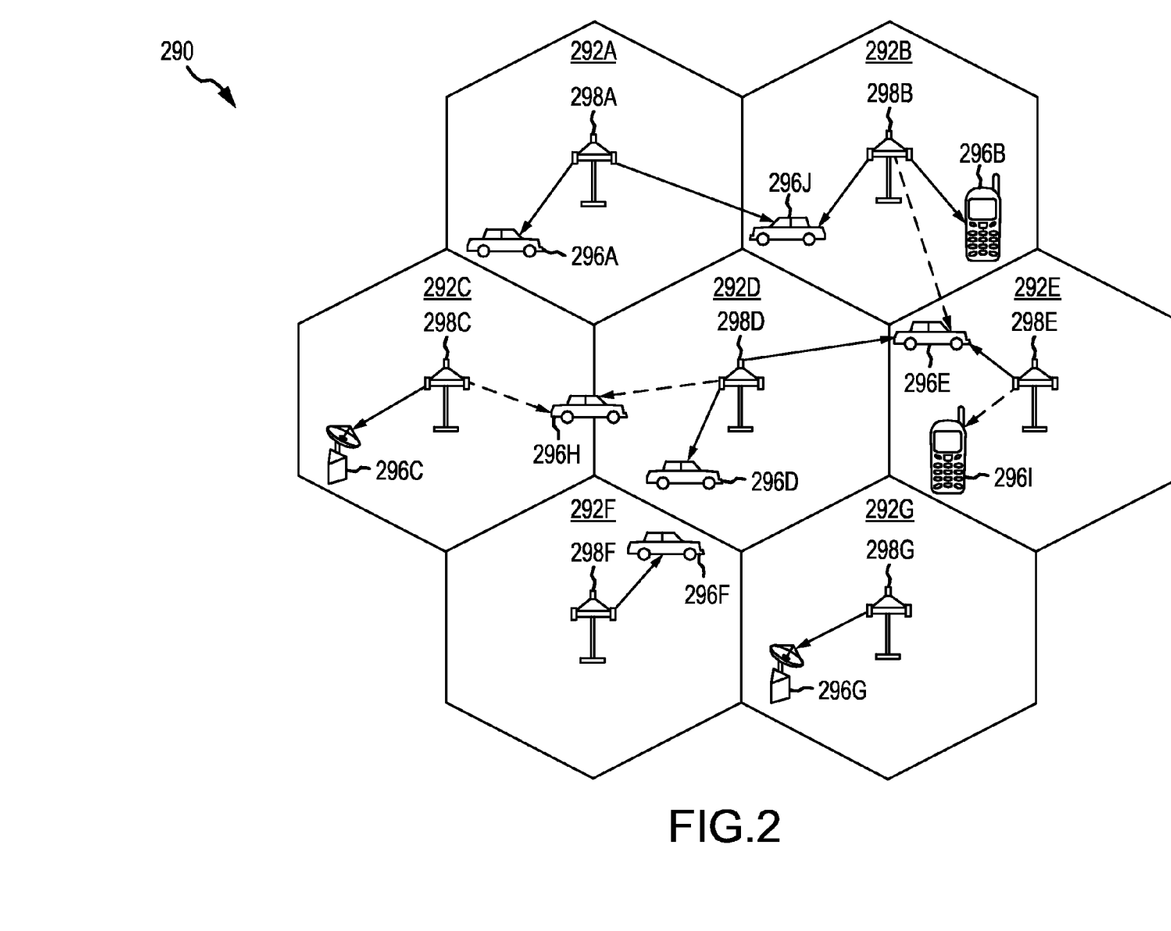
FIG. 2 illustrates an example of a wireless communications system that supports a plurality of users.

FIG. 2 illustrates an example of a wireless communications system 290 that supports a plurality of users (e.g., mobile user devices 296B, 296I). In FIG. 2, reference numerals 292A to 292G refer to cells, reference numerals 298A to 298G refer to base stations (BS) or base transceiver station (BTS) and reference numerals 296A to 296J refer to access User Equipments (UE) or mobile user devices. Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, wireless networks are preferred when the network elements are mobile with dynamic connectivity needs or if the network architecture is formed in an ad hoc, rather than fixed or pre-planned, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. On the other hand, usage of wireless propagation requires active resource management among the network users and higher levels of mutual coordination and cooperation to yield compatible spectrum utilization.

One important aspect in a wireless network is the identification of devices and users within the network. Each mobile device provides an identifier that allows the network to correctly route messages such as authorization requests and calls to it. There are a variety of identifiers in use by various communications systems. For example, for systems based on Third Generation Partnership Project (3GPP) standards, the international mobile subscriber identity (IMSI) identifies the subscription and the mobile station international subscriber directory number (MSISDN) is the dialing number. In one aspect, the IMSI provides a unique number for all GSM and UMTS users and is stored within a subscriber identity module (SIM) within the mobile device. In another aspect, the MSISDN may be used to route calls to a subscriber. In another example, for systems based on Third Generation Partnership Project 2 (3GPP2) standards, the mobile identification number (MIN) identifies the subscription and the mobile identification number/mobile directory number (MIN/MDN) is the dialing number.

In one aspect, these identification numbers at the present time are globally unique and statically assigned. In one example, the identification numbers can be changed using over-the-air (OTA) procedures. As machine to machine (M2M) communication devices that make use of the 3GPP and/or 3GPP2 systems proliferate, wireless network operators will eventually run out of available identity values if they continue using statically assigned current values, due to the limited number of identity values available. Thus, the permanent association of finite number of device identifiers with devices presents a limitation in current communications systems.

In one aspect, for 3GPP systems, the IMSI has a length of 15 decimal digits with the following components:

Mobile Country Code (MCC)—typically 3 decimal digits

Mobile Network Code (MNC)—typically 2 or 3 decimal digits

Mobile Station Identification Number (MSIN)—typically 9 or 10 decimal digits.

In another aspect, the IMSI/MIN identifies the subscription to the mobile network and identifies the Home Operator who is the wireless system operator responsible for authorizing the service for the mobile device. In one example, the combination of the Mobile Country Code (MCC) and Mobile Network Code (MNC) uniquely identifies the Home Operator. In another aspect, for 3GPP2 systems, the MSISDN/MIN/MDN parameters also have similar size limitations, usually 10 to 15 decimal digits in length.

In one example, the current usage of IMSI/MIN employs a one to one correspondence between an active device and a mobile subscription. The IMSI/MIN identifies a particular subscription and is static for a mobile device using a particular subscription. In one aspect, the IMSI/MIN is either provisioned onto a smartcard (e.g. subscriber identity module/ universal subscriber identity module/CDMA subscriber identify module (SIM/USIM/CSIM)) or provisioned into the mobile device if no smartcard is used (e.g. if using a user identity module (UIM)).

In one aspect, the proliferation of M2M devices causes a practical problem since the number of available identity values is limited. For example, MSN may be limited to 9 or 10 decimal digits. As more M2M devices are deployed, operators will begin to run out of available identity values if they use statically assigned values. Thus the current identity value assignment approach may not be sustainable in the long run.

In one aspect, many mobile devices are only registered to the network for a small fraction of time, that is, mobile device may have a low duty cycle. In another aspect, a mobile device may only need unique identities while the device is registered to the network for service. Thus, a technique proposed in the present disclosure allows multiple mobile devices to share an identity value, allowing identity reuse. In one example, each mobile device may have multiple IMSI/MIN values that it can try using if the first choice is already in use by another device. Moreover, in another example, the MSISDN/MDN can be determined from the selected IMSI/MIN value.

In one example, a solution is needed to avoid identity collision. That is, no two mobile devices may concurrently use the same identity values. If mobile devices are registered using a particular set of identities, and another mobile device attempts to register using any of the identities from the set, then the Home Operator does not authorize the second registration. When a mobile device has the registration request rejected with a particular identity value, then the mobile device can either try another identity value that it is configured to use or try again with the same identity value at a later time. When a mobile device using a particular identity value de-registers, then the identity value is freed for use by another device.

In another example, a solution is needed to identify the authentication key. That is, currently the Home Operator associated with the IMSI/MIN uses the IMSI/MIN to identify the authentication keys and associated profiles used by the mobile device and must handle the case when the IMSI/MIN changes. In one aspect, the system can provide authentication bypass, for example, if the system knows that the mobile device is authenticated by other means or is trusted. Alternatively, multiple IMSI/MIN values may be distributed, or identification may be based on hardware identity.

In one example, some systems may choose to bypass authentication procedures or to use a key which is shared by all devices. In one aspect, this step is the simplest solution. This simple step provides no security; however, in some deployments the risks may be mitigated by other factors.

In another example, for multiple IMSI/MIN distribution, each device may be provisioned with a static set of IMSI/MIN values and associated authentication keys, one for each IMSI/MIN value. In one aspect, multiple devices may share IMSI/MIN values and associated authentication keys. In an example, implementations can decide how to assign the IMSI/MIN and associated authentication keys to devices, for example the number in a set and the number of devices which share the same IMSI/MIN values.

In one example, a set of devices is partitioned into subsets and each device in a subset is provisioned with the same set of IMSI/MIN values. This approach assumes that the number of IMSI/MIN values provisioned is less than the number of devices in a subset, and few devices from the same set will attempt to connect simultaneously. In another aspect, the IMSI/MIN values could be assigned randomly or according to some mathematical structure or process to decrease the probability of collision.

In another aspect, hardware-identity-based identification (a.k.a. hardware identifier) may be used. For example, hardware identities could be based on International Mobile Equipment Identity (IMEI), Mobile Equipment Identifier (MEID), Media Access Control (MAC) address, etc. For example, hardware identity-based identification works when the hardware identity is associated with the subscription. In these cases, the hardware identity of the device is also an identifier of the subscription information including the authentication key, profiles, etc. This feature allows the MSIN part of the IMSI to be any arbitrary value which will be ignored by the Home Operator. Additionally, there may be advantages for using a hardware identifier. First, the space of hardware identifiers is significantly larger than the space of IMSI/MIN values, so each device can have a unique hardware identifier. Second, the registration process requires providing a hardware identifier (in additional to the IMSI/MIN), so there are no changes to the messages exchanged in the system.

In another aspect, the operator can choose to use different approaches for different sets of devices. For example, initially the operator may use static IMSI/MIN values while there are a small number of M2M devices and then later choose to use the multiple IMSI/MIN distribution approach for the next set of M2M devices. As another example, even later the operator can use the IMEI/MEID-based identification with random MSIN values.

In another aspect, the dialing number may be determined from the IMSI/MIN values. For example, when the IMSI is defined as the concatenation of the MCC, MNC, and MSIN, the MCC and MNC are assigned to the values associated with the home operator. In another example, some digits of the MSIN may be fixed to pre-determined values that are reserved devices using the IMSI allocation scheme described above. The remaining digits of the MSIN may be assigned in a variety of ways. In another example, when the MSISDN is defined as the concatenation of a country code (CC), national destination code (NDC) or number planning area (NPA), and subscriber number (SN), the CC and NDC/NPA are assigned to the values associated with the home operator. Some digits of the SN are fixed to pre-determined values that are reserved for devices using this scheme for dialing number allocation. The remaining digits of the SN are assigned to those random digits selected by the device to be used in the IMSI/MIN. For example, if IMSI="123-456-789hijklm": where "hijklm" are decimal digits arbitrarily chosen by the device and the corresponding dialing number is "+98-765-4321hijklm": where hijklm is copied from IMSI. In another example, a similar method applies for derived MDN from MIN. One skilled in the art would understand that the example shown here is not exclusive. Although the example is illustrated with six digits arbitrarily chosen by the device, one skilled in the art would understand that more or fewer digits could be chosen without affecting the spirit or scope of the present disclosure. A problem being solved by the present disclosure is that if it is desired to allow dialing number re-use, for example in the same way as allowing IMSI re-use, then this requires both network and device to know what the current dialing number is. Presently, the existing registration process does not allow the device and network to communicate information about the dialing number. The present disclosure requires no changes to the messages exchanged in order to communicate information about the dialing number.

Figure 3:
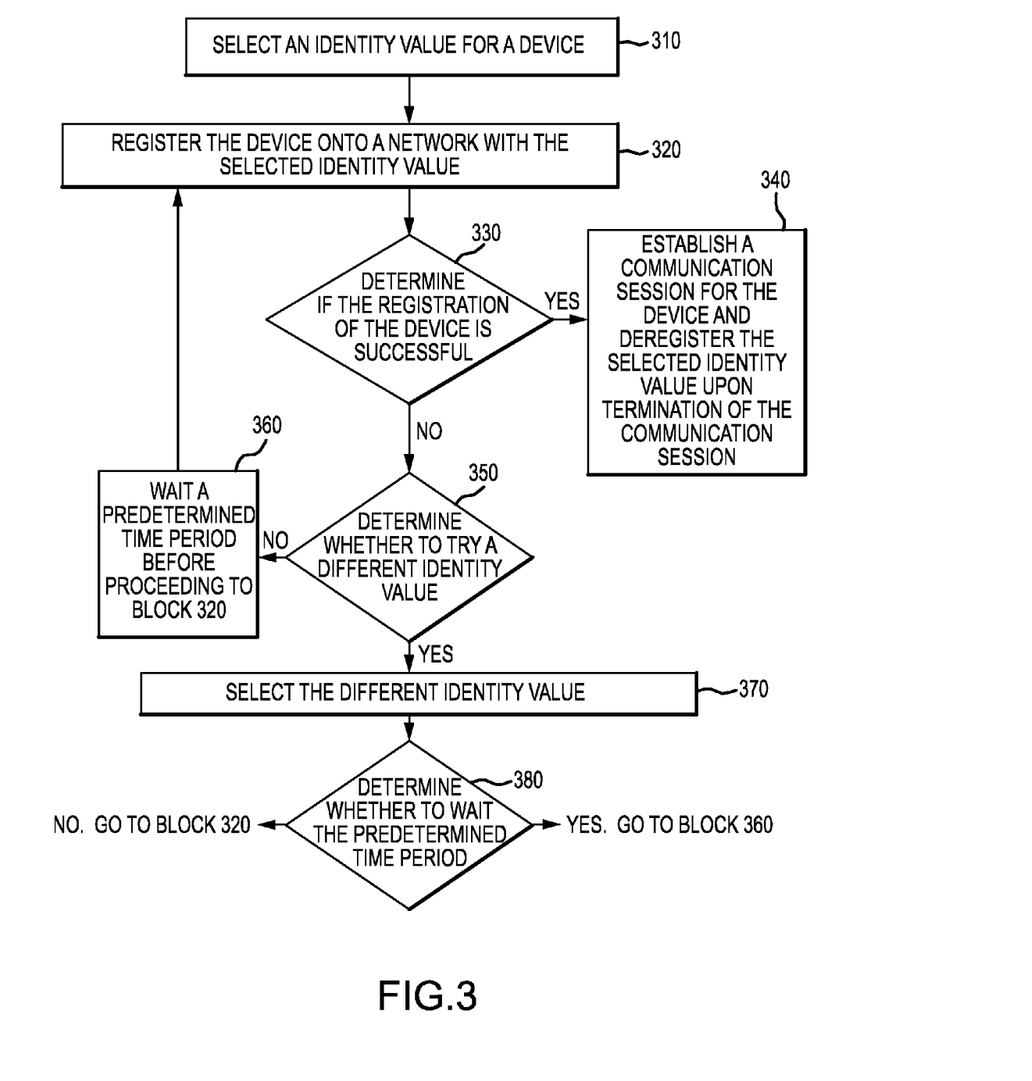
FIG. 3 illustrates an example flow diagram for identity reuse.

FIG. 3 illustrates an example flow diagram for identity reuse. In block 310, select an identity value for a device. In one example, the identity value is selected from a plurality of available identity values. Following block 310, in block 320, register the device onto a network with the selected identity value. Following block 320, in block 330, determine if the registration of the device is successful. If yes, that is, the registration is successful, proceed to block 340. In block 340, establish a communication session for the device and deregister the selected identity value upon termination of the communication session. If no, that is, the registration of the device is not successful in block 330, proceed to block 350. In block 350, determine whether to try a different identity value. In one example, the different identity value is from the plurality of identity values. In one example, at least one predetermined criteria is used in the determining process. One skilled in the art would understand that the at least one predetermined criteria can be based on various parameters, such as but not limited to, application parameters, design parameters, user choice, etc. without affecting the spirit or scope of the present disclosure.

If the determination in block 350 is to not try the different identity value, then proceed to block 360 to wait a predetermined time period before proceeding to block 320 to register again the device onto the network with the selected identity value. If the determination in block 350 is to try the different identity value, then proceed to block 370. In block 370, select the different identity value. Following block 370, in block 380, determine whether to wait the predetermined time period. If no, proceed to block 320 to register the device onto the network with the different identity value. If yes, proceed to block 360.

One skilled in the art would understand that the steps disclosed in the example flow diagram in FIG. 3 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any non-transitory computer-readable medium known in the art or implemented in any computer program product known in the art.

In one or more examples, the steps or functions described herein may be implemented in hardware, software, firmware, or any combination thereof. If implemented in software, the functions may be stored on a non-transitory computer-readable medium. Non-transitory computer-readable storage media includes computer storage media including any non-transitory medium that facilitates transfer of a computer program from one place to another. A non-transitory storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Figure 4:
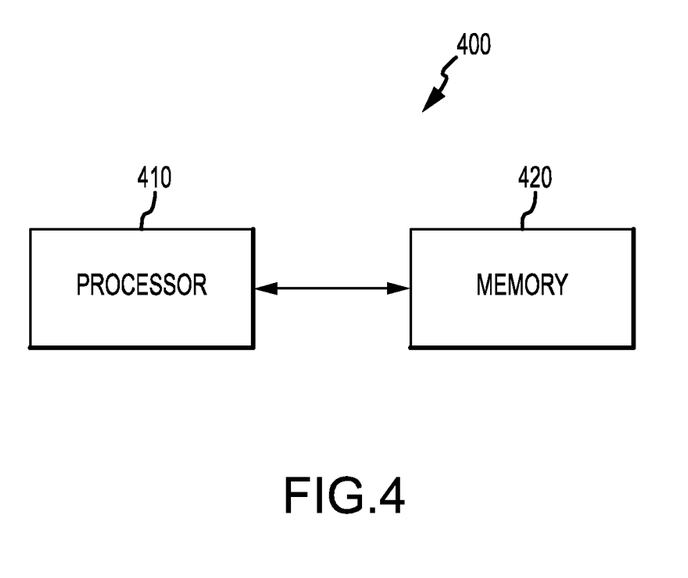
FIG. 4 illustrates an example of a device comprising a processor in communication with a memory for executing the processes for identity reuse.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 illustrates an example of a device 400 comprising a processor 410 in communication with a memory 420 for executing the processes for identity reuse. In one example, the device 400 is used to implement the algorithm illustrated in FIG. 3. In one aspect, the memory 420 is located within the processor 410. In another aspect, the memory 420 is external to the processor 410. In one aspect, the processor includes circuitry for implementing or performing the various flow diagrams, logical blocks and/or modules described herein.

Figure 5:
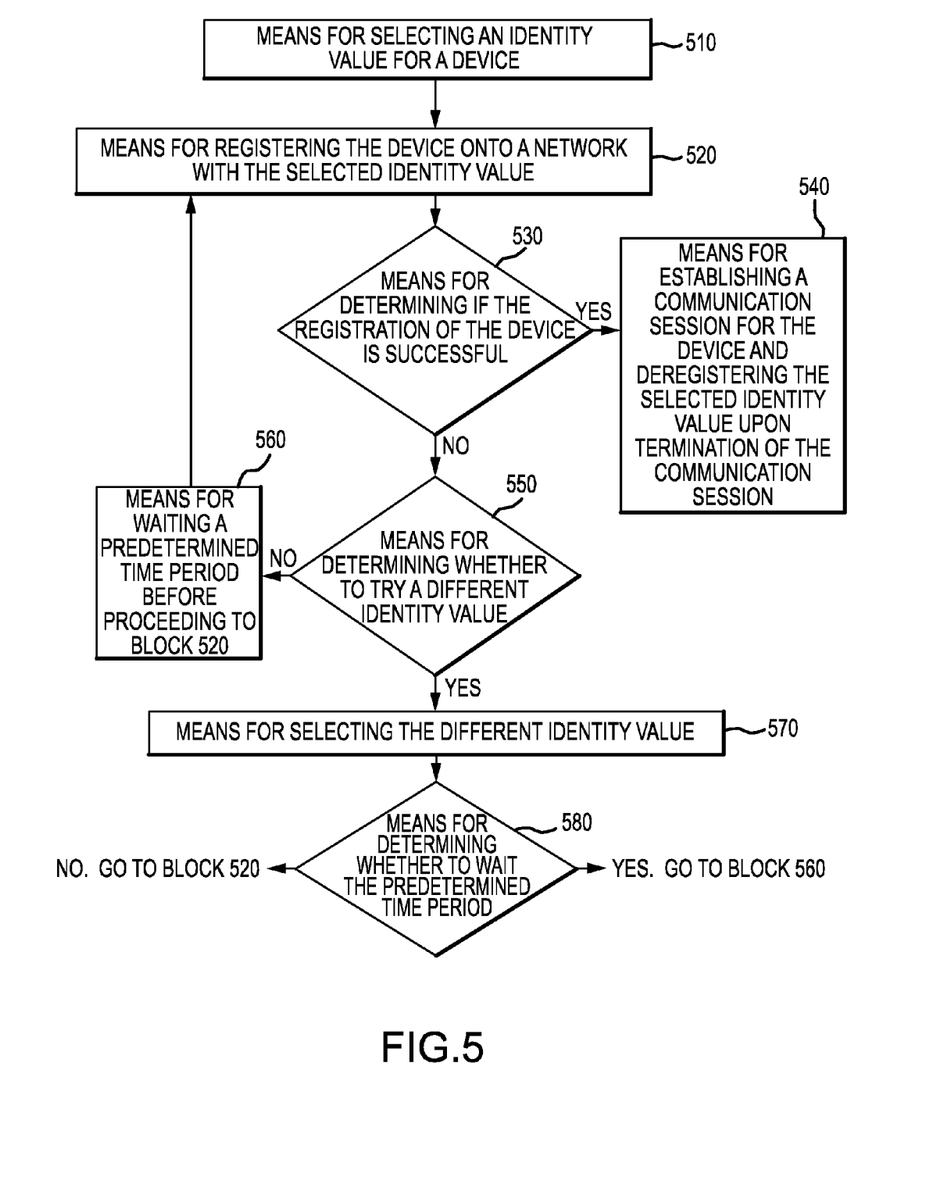
FIG. 5 illustrates an example of a device suitable for identity reuse.

FIG. 5 illustrates an example of a device 500 suitable for identity reuse. In one aspect, the device 500 is implemented by at least one processor comprising one or more modules configured to provide different aspects of identity reuse as described herein in blocks 510, 520, 530, 540, 550, 560, 570 and 580. For example, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for identity reuse operable in a communications system, the method comprising: selecting an identity value for a device; registering the device onto a network with the selected identity value; determining whether the registration of the device with the selected initial identity value is successful; establishing a communication session for the device when it is determined that the registration of the device with the selected initial identity value is successful; determining whether to subsequently register the device on the network with a different identity value when it is determined that the initial registration of the device with the selected initial identity value is unsuccessful; waiting a predetermined period of time before subsequently registering the device when it is determined that the registration of the device with the selected initial identity value is unsuccessful; selecting the different identity value when it is determined to subsequently register the device on the network with the different identity value; subsequently registering the device with the initial identity value when it is not determined to subsequently register the device on the network with the different identity value; and subsequently registering the device with the different value when it is determined to subsequently register the device on the network with the different identity value.

2. The method of claim 1, wherein the initial identity value is an international mobile subscriber identity (IMSI) with one or more of the following components: Mobile Country Code (MCC) or Mobile Network Code (MNC).

3. The method of claim 1, wherein the communication system is part of a 3GPP system, a 3GPP2 system or a dual mode 3GPP/3GPP2 system.

4. The method of claim 3, wherein the initial identity value is based on at least one mobile identification number (MIN) parameter, mobile station international subscriber directory number (MSISDN) parameter or mobile directory number (MDN) parameter.

5. The method of claim 1, further comprising using the selected initial identity value to identify an authentication key.

6. The method of claim 5, wherein the authentication key is shared by more than one device.

7. The method of claim 2, further comprising choosing to bypass authentication.

8. The method of claim 1, wherein the initial identity value is static.

9. The method of claim 1, further comprising using a dialing number based on the initial identity value for establishing the communication session.

10. The method of claim 1, wherein the initial identity value is a hardware-identity-based identification.

11. An apparatus for identity reuse operable in a communications system, the apparatus comprising: a processor; and a memory coupled to the processor, wherein the memory having stored thereon program code configured to cause executable by the processor to perform operations comprising: selecting an initial identity value for a device; registering the device onto a network with the selected initial identity value; determining whether the registration of the device with the selected initial identity value is successful; establishing a communication session for the device when it is determined that the registration of the device with the selected initial identity value is successful; determining whether to subsequently register the device on the network with a different identity value when it is determined that the initial registration of the device with the selected initial identity value is unsuccessful if the registration is not successful; waiting a predetermined period of time before subsequently registering the device when it is determined that the registration of the device with the selected initial identity value is unsuccessful; wherein the stored program code is configured to cause the processor to perform operations further comprising: selecting the different identity value when it is determined to subsequently register the device on the network with the different identity value; subsequently registering the device with the initial identity value when it is not determined to subsequently register the device on the network with the different identity value; and subsequently registering the device with the different value when it is determined to subsequently register the device on the network with the different identity value.

12. The apparatus of claim 11, wherein the initial identity value is an international mobile subscriber identity (IMSI) with one or more of the following components: Mobile Country Code (MCC) or Mobile Network Code (MNC).

13. The apparatus of claim 11, wherein the communication system is part of a 3GPP system, a 3GPP2 system or a dual mode 3GPP/3GPP2 system.

14. The apparatus of claim 13, wherein the initial identity value is based on at least one mobile identification number (MIN) parameter, mobile station international subscriber directory number (MSISDN) parameter or mobile directory number (MDN) parameter.

15. The apparatus of claim 11, wherein the stored program code is configured to cause the processor to perform operations further comprising using the selected initial identity value to identify an authentication key.

16. The apparatus of claim 15, wherein the authentication key is shared by more than one device.

17. The apparatus of claim 12, wherein the stored program code is configured to cause the processor to perform operations further comprising choosing to bypass authentication.

18. The apparatus of claim 11, wherein the initial identity value is static.

19. The apparatus of claim 11, wherein the stored program code is configured to cause the processor to perform operations further comprising using a dialing number based on the initial identity value for establishing the communication session.

20. The apparatus of claim 11, wherein the identity value is a hardware-identity-based identification.

21. An apparatus for identity reuse operable in a communications system, the apparatus comprising: means for selecting an initial identity value for a device; means for registering the device onto a network with the selected initial identity value; means for determining whether the registration of the device with the selected initial identity value is successful; means for establishing a communication session for the device when it is determined that the registration of the device with the selected initial identity value is successful; means for determining whether to subsequently register the device on the network with a different identity value when it is determined that the initial registration of the device with the selected initial identity value is unsuccessful; means for waiting a predetermined period of time before subsequently registering the device when it is determined that the registration of the device with the selected initial identity value is unsuccessful; means for selecting the different identity value when it is determined to subsequently register the device on the network with the different identity value; means for subsequently registering the device with the initial identity value when it is not determined to subsequently register the device on the network with the different identity value; and means for subsequently registering the device with the different value when it is determined to subsequently register the device on the network with the different identity value.

22. The apparatus of claim 21, wherein the initial identity value is an international mobile subscriber identity (IMSI) with one or more of the following components: Mobile Country Code (MCC) or Mobile Network Code (MNC).

23. The apparatus of claim 21, wherein the communication system is part of a 3GPP system, a 3GPP2 system or a dual mode 3GPP/3GPP2 system.

24. The apparatus of claim 23, wherein the initial identity value is based on at least one mobile identification number (MIN) parameter, mobile station international subscriber directory number (MSISDN) parameter or mobile directory number (MDN) parameter.

25. The apparatus of claim 21, further comprising means for using the selected initial identity value to identify an authentication key.

26. The apparatus of claim 25, wherein the authentication key is shared by more than one device.

27. The apparatus of claim 22, further comprising means for choosing to bypass authentication.

28. The apparatus of claim 21, wherein the initial identity value is static.

29. The apparatus of claim 21, further comprising means for using a dialing number based on the initial identity value for establishing the communication session.

30. The apparatus of claim 21, wherein the initial identity value is a hardware-identity-based identification.

31. A non-transitory computer-readable storage medium having stored thereon processor-executable software instructions configured to cause a processor to perform operations comprising: selecting an identity value for a device; registering the device onto a network with the selected identity value; determining whether the registration of the device with the selected initial identity value is successful; establishing a communication session for the device when it is determined that the registration of the device with the selected initial identity value is successful; determining whether to subsequently register the device on the network with a different identity value when it is determined that the initial registration of the device with the selected initial identity value is unsuccessful; waiting a predetermined period of time before subsequently registering the device when it is determined that the registration of the device with the selected initial identity value is unsuccessful; wherein the stored processor-executable software instructions are configured to cause a processor to perform operations further comprising: selecting the different identity value when it is determined to subsequently register the device on the network with the different identity value; subsequently registering the device with the initial identity value when it is not determined to subsequently register the device on the network with the different identity value; and subsequently registering the device with the different value when it is determined to subsequently register the device on the network with the different identity value.

32. The non-transitory computer-readable storage medium of claim 31, wherein the initial identity value is an international mobile subscriber identity (IMSI) with one or more of the following components: Mobile Country Code (MCC) or Mobile Network Code (MNC).

33. The non-transitory computer-readable storage medium of claim 31, wherein the communication system is part of a 3GPP system, a 3GPP2 system or a dual mode 3GPP/3GPP2 system.

34. The non-transitory computer-readable storage medium of claim 33, wherein the initial identity value is based on at least one mobile identification number (MIN) parameter, mobile station international subscriber directory number (MSISDN) parameter or mobile directory number (MDN) parameter.

35. The non-transitory computer-readable storage medium of claim 31, wherein the stored processor-executable software instructions are configured to cause a processor to perform operations further comprising using the selected initial identity value to identify an authentication key.

36. The non-transitory computer-readable storage medium of claim 35, wherein the authentication key is shared by more than one device.

37. The non-transitory computer-readable storage medium of claim 32, wherein the stored processor-executable software instructions are configured to cause a processor to perform operations further comprising choosing to bypass authentication.

38. The non-transitory computer-readable storage medium of claim 31, wherein the initial identity value is static.

39. The non-transitory computer-readable storage medium of claim 31, wherein the stored processor-executable software instructions are configured to cause a processor to perform operations further comprising using a dialing number based on the initial identity value for establishing the communication session.

40. The non-transitory computer-readable storage medium of claim 31, wherein the initial identity value is a hardware-identity-based identification.

* * * * *